Nov. 8, 1949   G. L. WOOLNOUGH   2,487,204
ELECTRICAL ENERGY REGULATOR
Filed Aug. 5, 1946   5 Sheets-Sheet 1

INVENTOR
Geoffrey Laurence Woolnough
By
ATTORNEYS

Nov. 8, 1949  G. L. WOOLNOUGH  2,487,204
ELECTRICAL ENERGY REGULATOR
Filed Aug. 5, 1946  5 Sheets-Sheet 2

INVENTOR
Geoffrey Lawrence Woolnough
By
ATTORNEYS

Nov. 8, 1949    G. L. WOOLNOUGH    2,487,204
ELECTRICAL ENERGY REGULATOR

Filed Aug. 5, 1946    5 Sheets-Sheet 3

INVENTOR
Geoffrey Lawrence Woolnough
By
ATTORNEYS

Nov. 8, 1949     G. L. WOOLNOUGH     2,487,204
ELECTRICAL ENERGY REGULATOR Filed Aug. 5, 1946     5 Sheets-Sheet 5

FIG. 9.

INVENTOR
Geoffrey Lawrence Woolnough
By Marvin L. Bateman
ATTORNEYS

Patented Nov. 8, 1949

2,487,204

UNITED STATES PATENT OFFICE 2,487,204

ELECTRICAL ENERGY REGULATOR

Geoffrey Laurence Woolnough, Sale, England, assignor to Metropolitan-Vickers Electrical Company Limited, London, England, a company of Great Britain Application August 5, 1946, Serial No. 688,402
In Great Britain August 2, 1944

Section 1, Public Law 690, August 8, 1946
Patent expires August 2, 1964

7 Claims. (Cl. 200—122)

This invention relates to electrical energy regulators such as are, for example, particularly though not exclusively adapted as energy regulators for electric hotplates or boiling plates, or grill-boilers, that is to say electric heating devices of the kind which are adapted to effect, by radiation, convection, or conduction, cooking operations on, above, or below the device. The invention relates specifically to such energy regulators in which infinitely or finely variable control of energy input to the hotplate or other controlled device is obtainable by adjustment of the duration of time periods for which current is permitted by the regulator to flow to the hotplate or controlled device, in relation to the duration of intervening time periods in which the regulator reduces or interrupts said current.

A particularly advantageous form of energy regulator for the control of electric hotplates and the like is described and claimed in British Letters Patent No. 517,538, which regulator essentially comprises in combination a thermally responsive device arranged to actuate mechanically a switch for controlling the hotplate circuit, said switch operating with snap-action, a heater element associated with said thermally responsive device and connected in circuit with contacts actuated thereby so that the rate of heating of the thermally responsive device by said heater element is changed from one value to another value (one of which values may be zero) according as the circuit to the hotplate is opened or closed at said switch. Said thermally responsive device is maintained at or near a set mean temperature by operation of said thermally responsive device to cause the heating thereof by said heater element to alternate between said two values and thereby to close and open alternately the circuit of the hotplate and maintain a corresponding average input to the hotplate, and mechanical means are provided for adjusting the value of said set temperature and thereby the average value of the energy supplied to the hotplate. Means are also provided for compensating for the effect of changes in ambient temperature on the thermally responsive device over and above the temperature changes effected by said heater element so that the average energy input to the hotplate is determined by said adjusting means independently, or substantially independently, of variations in ambient temperature and of any thermal relation between said thermally responsive device and the hotplate.

The present invention relates to electric energy regulators of the kind comprising a combination of parts as just above set forth, and has for the main object a simplification and cheapening of the whole structure of the regulator by the employment inter alia of different supporting arrangements and certain other members. With these objects in view the regulator according to the present invention has the fixed and moving contacts and snap action mechanism of the switch carried from a base member by means of terminal members for said contacts extending in the same general direction as the axis of an adjusting cam coupled with or adapted for operation by an external knob or equivalent control member and adapted to effect displacement between a thermal element and switch in a direction perpendicular to said terminal members. Said thermal element again preferably comprises a bimetal element, and the regulator includes again means for compensating changes in ambient temperature, said compensating means being preferably also of bimetal form conveniently as in the arrangement described and claimed in British Letters Patent No. 517,538 aforesaid. Preferably, a lever is pivotally mounted on the base member for movement across the axis of the cam, which lever carries an abutment co-operating with the cam and transmits the cam action to the thermal element and snap-action switch. The thermal element and temperature compensating means may comprise a unitary assembly pivotally mounted on the base member on an axis extending parallel or substantially parallel with the axis of the adjusting cam, said unitary assembly having points differentially responsive to the deflections of the bimetal element and compensating means abutting against the adjusting cam and the snap-action switch means. As in the arrangement described in British Letters Patent No. 517,538 aforesaid, the assembly may comprise a pair of geometrically parallel bimetal strips connected together at one end of the pair and pivotally mounted at that end.

According to a further feature of the invention, the effective radius of the adjusting cam profile changes less with given increments of cam displacement over a range of cam displacements for providing a lower range of values of regulated energy than over a subsequent range of cam displacement for providing higher values of regulated energy, whereby finer control of the regulated energy is obtainable in said lower range than in said higher range. Preferably in carrying out the invention, the effective radius of the adjusting cam profile changes with given increments of cam displacement more rapidly at the two ends of the cam displacement than over the major part of the cam profile for a purpose hereinafter set forth.

According to another feature of the invention the snap-action switch is of the Burgess microswitch type according to British Letters Patent No. 419,917, the trifurcated spring blade forming the snap-action means of said switch being carried by one of the terminal members and extending perpendicularly or substantially perpendicularly from said terminal member into co-operative relation with a fixed contact carried by another terminal member. Preferably the first terminal member just above referred to comprises a main portion of strip form extending parallel or substantially parallel with the axis of the adjusting cam and a portion perpendicular or substantially perpendicular to said first portion with the adjacent ends of the outer prongs of the blade seated in grooves or the equivalent formed in a cranked or bent-over part or parts of said terminal member, said perpendicular portion of the terminal remote from the main portion of the latter carrying or forming a back-stop for the moving contact of the switch. Conveniently the perpendicular portion of said terminal member may be of double-cranked form having an aperture through which the middle prong of the trifurcated blade extends whilst the grooves in which are seated the outer prongs are formed on said cranked portion.

Conveniently in carrying out the invention the bimetal assembly may include a bifurcated lever pivoted on the same centre as or adjacent to the centre of the thermal element with the two arms of said lever disposed one on each side of said element whilst one of said arms adjacent the adjusting cam is formed or provided with an abutment portion co-operating with the cam periphery and the free ends of the arms carry an abutment co-operating with the thermal element.

According to a further feature of the invention, the energy regulator comprises three parallel terminal members extending parallel or substantially parallel with the axis of the adjusting cam, two of the terminal members carrying respectively the fixed and moving contacts of the switch and the heating element of the bimetal element being connected between one of said two terminals and the third terminal, said third terminal being adapted to provide connection of one side of the controlled apparatus with one side of the supply.

Preferably in carrying out the invention the terminals, which are conveniently of elongated strip form, secured to and extending from the base member, are located by recesses formed in a block of insulating material constituting the base member and provided with an aperture through which extends a shaft carrying at its inner end the adjusting cam and carrying or being adapted to carry at its outer end an adjusting knob or the equivalent.

In some applications of energy regulators to hotplates and the like, it is desired that the regulators shall also provide additional switching operations controlling heating elements of the hotplates, otherwise than by the intermittently closed contacts above referred to, and the present invention according to another aspect thereof provides a convenient construction of the regulator including contacts for providing control of the energy input to the hotplate or the like additional to that provided by the intermittently closed contacts of the regulator. For example, the regulator may be employed in conjunction with a two-element hotplate, the two elements of which are to be controlled by the regulator in the manner described in application for British Letters Patent No. 18,371 of 1944, or in a manner hereinafter to be described.

According to a further feature of the invention, therefore, the electric energy regulator according to the invention as hereinbefore set forth is provided with an additional snap-action switch operable by the adjusting cam or a member moving therewith at a desired position or positions of the cam. Conveniently the additional snap-action switch may include a contact operating member arranged for co-operation with an abutment forming part of or carried by an adjusting lever which, as hereinbefore set forth, transmits the cam action to the bimetal assembly, said abutment being displaceable by the adjusting cam or a portion thereof to operate said additional switch at a desired position or positions of the external knob or the like. Said abutment may co-operate with a cam surface separate from the main cam surface operating the first snap-action switch; said separate cam surface may form an integral part of the cam or be mounted directly thereon. Preferably in carrying out the invention the abutment just above referred to is formed on a secondary lever carried by the adjusting lever and pivotally mounted on the latter on an axis parallel with that of the movement of said adjusting lever. The additional snap-action switch is conveniently constructed in accordance with subsidiary features of the invention as hereinbefore described with reference to the first snap-action switch, that is to say the contacts and snap-action means of said switch are carried by terminal members as defined in the appended claims.

Preferred constructions of energy regulator according to the invention will now be described by way of example with reference to the accompanying drawings, in which.

In all the figures the same reference numerals designate similar parts.

Figure 2:
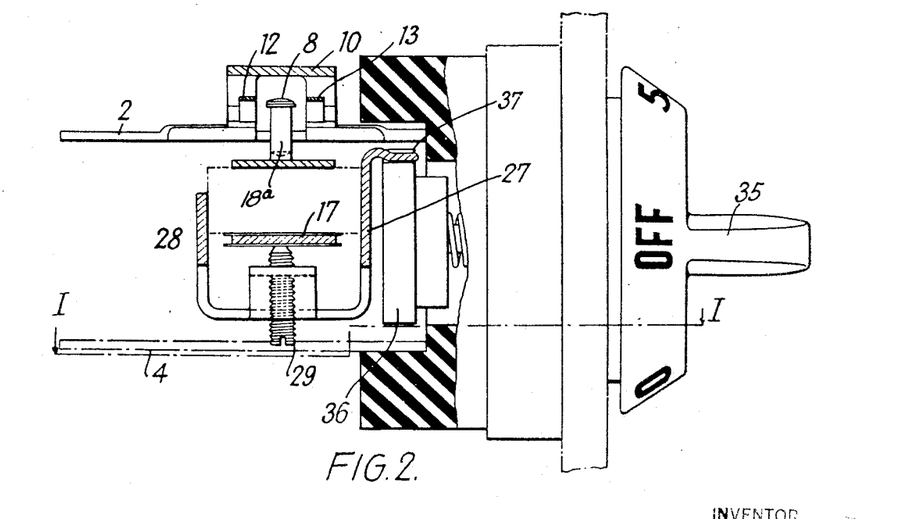
Figure 3:
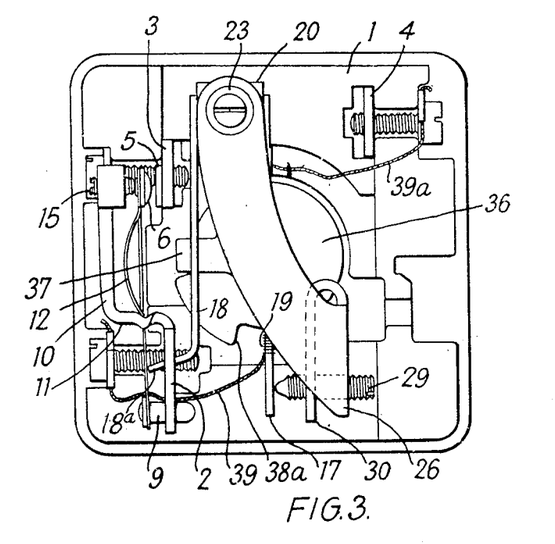
Fig. 3 is a rear elevation of the device of Figs. 1 and 2.
Figure 4:
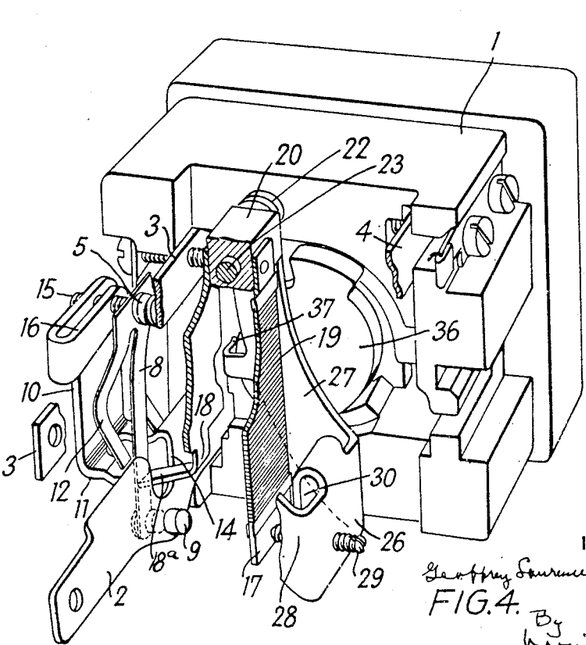
Fig. 4 is a fragmentary perspective elevation of said device.

The regulator shown in Figs. 1, 2, 3 and 4 comprises a base member 1 in the form of a block of unglazed porcelain or other suitable insulating material, which block is provided with slots and recesses as can be seen in more detail in Fig. 4, serving to receive and locate three terminal members designated 2, 3 and 4, respectively. The terminal members 2 and 3 have formed integrally therewith certain parts of the snap-action switch and carry other parts of said switch as will now be described.

The snap-action switch is of the well known Burgess micro-switch type according to British Letters Patent No. 419,917. The fixed contact member of the switch comprises a contact element 5 which is received in a perforation in the terminal strip 3. The moving contact 6 of the switch is carried on the end of a trifurcated spring blade member the central prong 8 of which is at its lower end secured to a peg 9 which has a force fit within a perforation in the terminal strip 2. Said terminal strip comprises a perpendicular portion 10 of double-cranked form the cranked part 11 of which has formed thereon grooves in which are seated the lower ends of the two outer prongs 12 and 13 of the trifurcated spring blade; the terminal element comprising the strip portion 2 and perpendicular portion 10 is suitably apertured at 14 to accommodate the centre prong 8 of the snap-action member. The portion 10 of the terminal member 2 serves to carry a back-stop for the moving contact, this back-stop being in the form of an adjustable screw 15 which is received in a screw threaded bore on the upper end of the member 10 and in an aligned screw-threaded bore in a bent-over portion 16 of the part 10 as can clearly be seen in Fig. 4.

The switch is operated by a bimetal and temperature compensating unitary assembly which comprises, as in the arrangement described in British Letters Patent No. 517,538 aforesaid, a pair of bimetal elements 17 and 18 of which the element 17 carries the heating winding 19 and of which the element 18 provides compensation for variations of ambient temperature, the two elements being arranged to deflect in the same direction with change of temperature. These bimetal strips are riveted to a block 20 which is pivotally mounted on bushes 21 and 22 carried by a bolt 23 which is received in a bore in the insulating base member 1, the bolt being held in place on said member by means of a nut 24 received in a recess 25 on the forward face of said base member.

There is also pivotally mounted on the bolt 23, independently of the block 20, an adjusting lever 26 which is of bifurcated form bent out of a suitably cut single sheet metal member, this lever having two arms 27 and 28 located one at each end of the pivoted block 20. The adjusting lever 26 carries at its free end an adjustable abutment in the form of a screw 29 received in a screw-threaded perforation in a lateral position of lever 26 and an aligned threaded perforation in a turned-over portion 30 of said lever, as can most clearly be seen from Figs. 3 and 4. The screw 29 has a pointed end abutting against the lower or free end of the bimetal strip 17, whilst the free end of the bimetal strip 18 is formed with an abutment portion 18a of reduced width which is bent over so as to extend through the aperture at 14 to engage the centre prong 8 of the trifurcated snap-acting member below the grooves in the part 11 of the terminal member 2.

The base block 1 is provided with a central aperture in which is mounted a bush 31, this bush being externally screw-threaded to receive a nut 32 by which the bush is held in place, the bush being also adapted to receive a further nut 32a by which the regulator can be located by a single hole fixing on, for example, a panel or the like 33 of a cooker in which the device is to be installed. There is journalled within the bush 31 an adjusting shaft or spindle 34 the outer end of which receives a suitable adjusting knob or the like, such as that shown by way of example at 35, and which shaft at its inner or rearward end has secured thereto an adjusting cam 36. The arm 27 of the bifurcated adjusting lever 26 is provided with a lateral bent-over extension 37 co-operating with the periphery of the cam 36.

Figure 1:
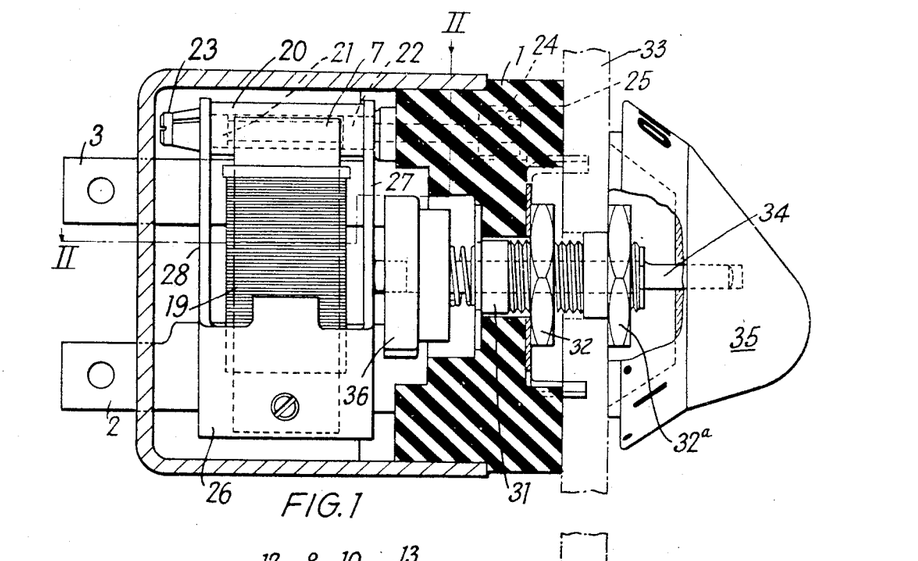
Figs. 1 and 2 are respectively a side elevation and plan view, mainly in section, of one construction of regulator, the section in Fig. 1 being taken on the plane I—I of Fig. 2, and Fig. 2 being taken on the plane II—II of Fig. 1.

The shaft 34 and cam 36 are, in Figs. 1, 2 and 3, illustrated in the "off" position, the "off" position being determined by the abutment against the extension 37 of a stepped part 38 of the cam. In this position of the cam the adjusting lever is positioned so that, through the abutment screw 29 the bimetal assembly will be located in such position that the part 18a displaces the snap-acting member to the left in Fig. 3 whereby to open the contacts 5 and 6. In operation the terminals 3 and 4 are connected respectively with the two supply lines. The heating element of the hotplate to be controlled is connected at its ends respectively with the terminal 2 and the terminal 4.

Figure 5:
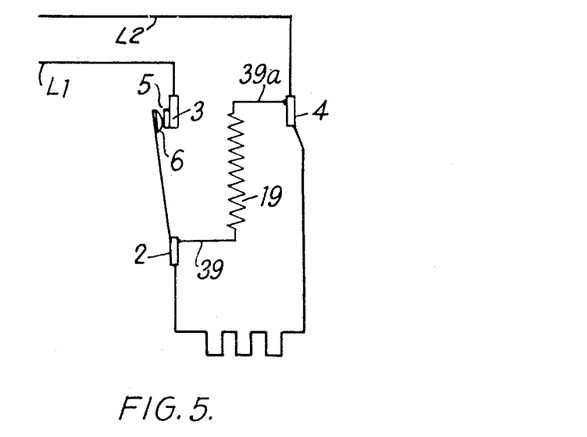
Fig. 5 is an electrical circuit diagram showing the electrical connections of the regulator of Figs. 1 to 4, Figs. 6 and 7, are views corresponding respectively with Figs. 1 and 3 of a modification of the regulator of the preceding figures.

The heating winding 19 of the regulator is connected with the terminals 2 and 4 as shown by the conductors 39 and 39a. The regulator is shown connected with supply lines L1 and L2 and a hotplate element H, in Fig. 5.

In operation therefore the heating winding 19 and the controlled hotplate are connected in parallel with one another and both in series with the contacts 5 and 6. In the illustrated "off" position the contacts 5 and 6 are maintained open so that the hotplate is continuously de-energised. The cam surface is given such form that as the knob is rotated in the clockwise direction, as viewed from the front of the device, whereby the cam 36 moves in the counterclockwise direction in Fig. 3, the extension 37 is allowed to move further to the right in Figs. 3 and 4 so that the portion 18a of the bimetal strip 18 will allow the snap-action switch to close its contacts 5 and 6. The hotplate is therefore energised and with it the heating winding 19 which thereupon raises the temperature of the bimetal strip 17, but not of the bimetal strip 18, whereby, since the strips are arranged to deflect their free ends to the right in Fig. 3 upon heating the portion 18a will be moved to the left to re-open the switch. This de-energises both the hotplate element and the heating winding 19 so that the temperature of the bimetal strip 17 falls and the portion 18a moves again to the right to allow the switch to reclose whereupon the above described cycle of operations is repeated and continued indefinitely. As the cam is rotated further in the clockwise direction in Fig. 3 a progressively smaller radius of said cam is brought into engagement with the extension 37, allowing the adjusting lever 26 and bimetal assembly to move still further to the right in Fig. 3 so that the temperature of the bimetal element 17 must be raised to a greater value before the switch contacts are open, the result being that the proportion of time for which the contacts are closed and the hotplate element energized is increased progressively by said movement of the cam. Finally when the stepped part 38a of the cam is brought up to the extension 37, providing the maximum energy position, the cam radius is so small that the bimetal strip 17 when continuously energised does not deflect sufficiently to open the switch contacts so that the hotplate is then continuously energised.

In the particular knob shown in Figs. 1, 2 and 3, the knob is calibrated with a position "off" and a range of positions "0" to "5"; preferably for the control of a hotplate the cam profile is made fairly steep between the positions "off" and "0", so that slight wear which may occur during use will not shift to an appreciable extent the position of the knob ("0") at which minimum energy input commences. The profile may then be almost but not quite flat between the knob positions "0" to "2.5" so that over the range of adjustment most commonly used, generally up to about twenty per cent of full power of the hotplate, half the range of knob movement is employed. The profile is steeper as the knob displacement is increased and finishes steeply to obtain continuous energy input to the hotplate at the position "5". It will be understood that less critical adjustment is normally required from knob positions "2.5" to "5", so that the effects of reasonable manufacturing tolerances and any variation of thermal characteristic have little effect.

It will be understood that the adjusting screw 15 provides an initial "preset" adjustment for the micro-switch as does the adjusting screw 29 for the bimetal assembly. A preset adjustment of the snap-action switch may also be obtained by longitudinal movement of the peg 9 within its aperture in the terminal 2.

Figure 6:
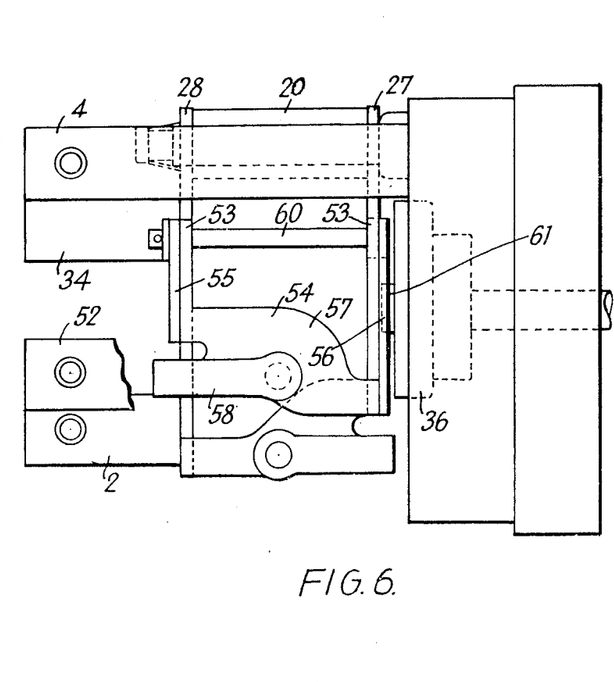
Figure 7:
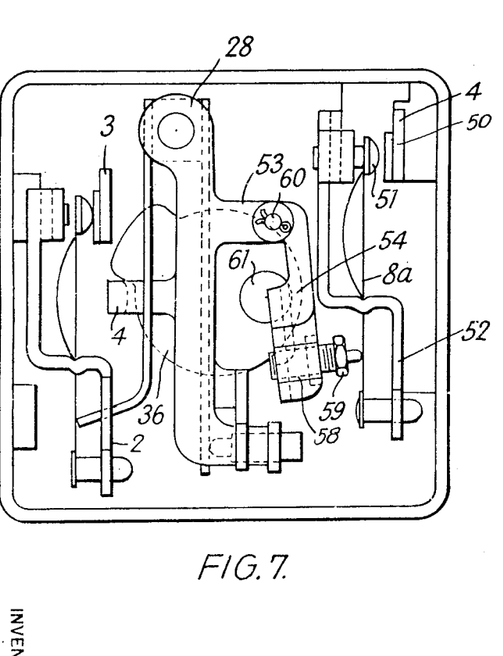

In some applications of hotplate regulator it is desirable or convenient to provide in a single regulator means which in accordance with the setting of the same knob or the like as that which controls the regulator shall also provide for the switching in and out of various combinations of hotplate elements at different positions of the knob. The construction according to the present invention is well adapted for such provision as is shown by Figs. 6 and 7 which are views, corresponding respectively with Figs. 1 and 3, of a modification of the device of the earlier figures for controlling a two-element hotplate. The regulator comprises as before terminals 2, 3 and 4, of which the terminals 2 and 3 carry the parts of the snap-acting switch controlled by the cam 36 whilst the terminal 4 carries a fixed contact 50 of the second snap-action switch the moving contact 51 of which is carried by a fourth terminal member 52 of identical form to and carrying the micro-switch in identical manner to the terminal member 2.

The adjusting lever 26 again comprises two arms 27 and 28 mounted one on each side of the block 20, but said arms are of slightly different form, being provided with lugs 53 which serve pivotally to support a secondary adjusting lever 54 which secondary lever 54 is also bent from a single sheet metal member and comprises a pair of parallel links 55 and 56 united at their lower ends by a cross portion 57 which is also provided with a bent-over portion 58 having a screw-threaded perforation aligned with a screw-threaded perforation in the main part 57; said perforations receive a screw-threaded tappet 59 which engages with the spring blade member 8a of the snap-action switch carried by the terminal member 52. The links 55 and 56 are pivotally attached to the lugs 53 on a spindle 60. The cam 36 has formed on the rear face thereof an eccentric boss 61 which is adapted to cooperate with the side of the link 56.

It will be clear that the boss 61 due to its eccentricity is adapted to displace the secondary lever 54 about the pivot 60 whereby to operate the moving contact 51 of the snap-action switch.

In the form shown in Fig. 6 the contacts 51 and 50 are biased by the snap-action member 8a to the open position being adapted to be closed when the secondary lever 54 is displaced to the right by the boss 61.

Figure 8:
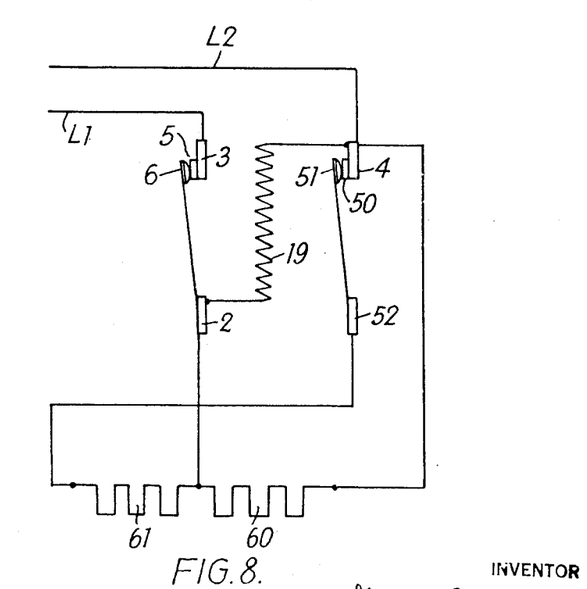
Fig. 8 is an electrical diagram showing one application of the device of Figs. 6 and 7.

In one particular application of the device shown in Figs. 6 and 7 the additional snap-action switch is employed for controlling the energisation of an auxiliary heating element of the hotplate so that when the shaft 34 is moved to its final position said auxiliary heating element will be continuously energised simultaneously with the main heating element of the hotplate. Fig. 8 shows the connection of the device for this purpose the main and auxiliary hotplate elements being shown at 60 and 61 respectively and the supply conductors at L1 and L2. The other references denote the same parts as do the corresponding references in Figs. 5 and 6. It will be seen that whereas the two ends of the elements 60 are connected across the terminals 2 and 4 to provide operation as in Figs. 1 to 4, the auxiliary heating element 61 is connected between the terminals 2 and 52 so as to be in series with both snap-action switches. The profile of the cam 36 is arranged so that the contact 6 will be engaged permanently with the contact 5 at some position of the cam before the final position of the latter whilst up to said first position from the initial position of the cam the additional snap-action switch will remain open. When the cam 36 is moved to its final position as shown in Fig 7 the boss 61 engages the secondary lever 54 which through the tappet 59 will displace the centre prong 8a of the trifurcated member of the additional snap-action switch whereby to close the contacts 51 and 50 and energise the hotplate element 61 in parallel with the hotplate element 60 through the contacts 5 and 6 which in this position of the cam remain continuously closed. The arrangement described with reference to Fig. 7 is applicable where it is desired to obtain very low heat inputs to the hotplate infinitely or finely variable in amount such as for simmering and also to enable the hotplate to be brought rapidly to the operating temperature by movement of the knob to the final position. The auxiliary heating element may be given such loading as to be capable at least in conjunction with the main heating element 60 of raising the temperature of the hotplate above the safe value thereof and as has been heretofore proposed a thermostatic device responsive to the temperature of the hotplate may be included in series with the auxiliary heating element 61 and arranged to interrupt the current in said element when the normal operated temperature is reached, leaving the energy input to the hotplate determined by the main heating element 60. The thermostatic device referred to may be of any convenient form adapted to open or close the circuit of the element 61 according as the temperature of the hotplate has unsafe or safe values.

Figure 9:
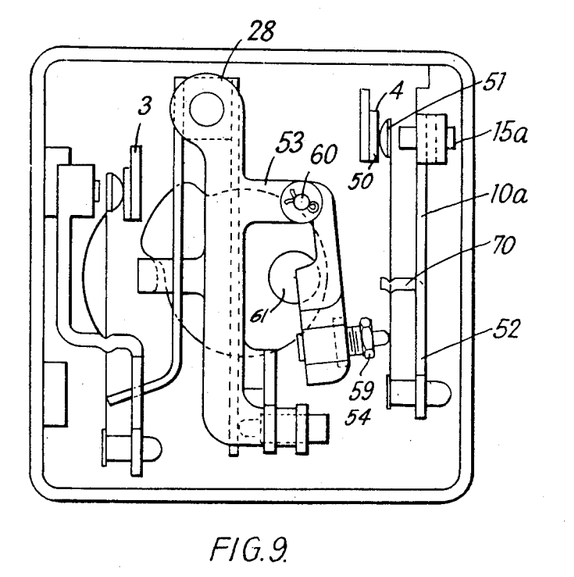
Fig. 9 is an elevation corresponding with Fig. 3 of a further modification of the regulator.

In other applications of the regulator with additional snap-action switch it may be desired that the contacts of the additional switch shall be normally closed but shall be capable of being closed by the adjusting knob or the like at a particular position or positions of the latter, and Fig. 9 is an end elevation corresponding with Fig. 6 whereby this result may be obtained. In Fig. 9 the lower end of the secondary lever again appears at 54 with its adjustable tappet 59. The terminal member 52 now has the portion 10a thereof located in the same plane as the main terminal part, whilst the outer prongs of the trifurcated spring blade member are located in grooves in a pair of lateral portions bent perpendicularly to the portion 10a and located one to each side of the latter, one of these perpendicular portions appearing at 70 in Fig. 9. The portion 10a again carries the adjustable back-stop 15a, whilst the terminal member 4 is located to the left of the spring blade member carrying the fixed contact 50 at its right-hand face to engage with the moving contact 51. A construction as exemplified by Fig. 9 may be for example employed in arrangements according to application for British Letters Patent No. 18,371 of 1944, but it will be understood that said construction has a general application where the second snap-action switch is required to be biased to the closed position and to be opened by engagement of the eccentric boss 61 with the secondary lever 54.

What I claim as new and desire to secure by Letters Patent of the United States is:

1. An electric energy regulator of the kind referred to, comprising an insulating base block, a plurality of elongated terminal members mounted on said block and extending away from one side thereof, a rotary member journaled in said block and extending therethrough, said rotary member having an operating portion extending from said block on the side thereof remote from said terminal members and carrying a cam surface on the other side of said block, a pair of bimetal elements rigidly secured together at adjacent ends thereof in substantially parallel spaced relation and pivotally mounted at their said ends on the block on an axis parallel with that of said rotary member, a cam follower in operative relation to the free end of one of said bimetal elements, a fixed contact mounted on one of said terminal members, a cooperating moving contact and snap-action spring assembly mounted on another of said terminal members with the contact moving element of said assembly in operative relation with the free end of the other of said bimetal elements, and a heating element for one of said bimetal elements connected between that terminal member carrying one of said contacts and another of said terminal members and operative to heat the last-mentioned bimetal element under control of said contacts and cause alternate opening and closing of said contacts with a ratio of closed time to open time adjustable by said cam.

2. An electric energy regulator of the kind referred to, comprising an insulating base block, a plurality of elongated terminal members mounted on said block and extending away from one side thereof, a rotary member journaled in said block and extending therethrough, said rotary member having an operating portion extending from said block on the side thereof remote from said terminal members and carrying a cam surface on the other side of said block, a pair of bimetal elements rigidly secured together at adjacent ends thereof in substantially parallel spaced relation and pivotally mounted at their said ends on the block on an axis parallel with that of said rotary member, a lever pivotally mounted on said base block for movement across the cam axis and having a projection engaging the periphery of the cam and an adjustable abutment in operative relation to the free end of one of said bimetal elements, a fixed contact mounted on one of said terminal members, a cooperating moving contact and snap-action spring assembly mounted on another of said terminal members with the contact moving element of said assembly in operative relation with the free end of the other of said bimetal elements, and a heating element for one of said bimetal elements connected between that terminal member carrying one of said contacts and another of said terminal members and operative to heat the last-mentioned bimetal element under control of said contacts and cause alternate opening and closing of said contacts with a ratio of closed time to open time adjustable by said cam.

3. An electric energy regulator of the kind referred to, comprising an insulating base block, a plurality of elongated terminal members mounted on said block and extending away from one side thereof, a rotary member journaled in said block and extending therethrough, said rotary member having an operating portion extending from said block on the side thereof remote from said terminal members and carrying a cam surface on the other side of said block, a pair of bimetal elements rigidly secured together at adjacent ends thereof in substantially parallel spaced relation and pivotally mounted at said ends on the block on an axis parallel with that of said rotary member, a bifurcated lever having arms disposed one on each side of the pair of bimetal elements and pivotally mounted on the pivotal axis of said bimetal elements, a lateral projection on one of said arms engaging the periphery of the cam, said arms being joined together adjacent the free end of the bimetal elements by a portion carrying an adjustable abutment in operative relation to the free end of one of said bimetal elements, a fixed contact mounted on one of said terminal members, a co-operating moving contact and snap-action spring assembly mounted on another of said terminal members with the contact moving element of said assembly in operative relation with the free end of the other of said bimetal elements, and a heating element for one of said bimetal elements connected between that terminal member carrying one of said contacts and another of said terminal members and operative to heat the last-mentioned bimetal element under control of said contacts and cause alternate opening and closing of said contacts with a ratio of closed time to open time adjustable by said cam.

4. An electric energy regulator of the kind referred to, comprising an insulating base block, a plurality of elongated terminal members mounted on said block and extending away from one side thereof, a rotary member journaled in said block and extending therethrough, said rotary member having an operating portion extending from said block on the side thereof remote from said terminal members and carrying a cam surface on the other side of said block, a pair of bimetal elements rigidly secured together at adjacent ends thereof in substantially parallel spaced relation and pivotally mounted at their said ends on the block on an axis parallel with that of said rotary member, a cam follower in operative relation to the free end of one of said bimetal elements, a fixed contact mounted on one of said terminal members, a leaf spring mounted on another of said terminal members and carrying a moving contact cooperating with said fixed contact, a snap-action element connecting said leaf spring with an abutment formed on the last-mentioned terminal member, an abutment providing operative engagement between said leaf spring and the other of said bimetal elements, and a heating element for one of said bimetal elements connected between that terminal member carrying one of said contacts and another of said terminal members and operative to heat the last-mentioned bimetal element under control of said contacts and cause alternate opening and closing of said contacts with a ratio of closed time to open time adjustable by said cam.

5. An electric energy regulator of the kind referred to, comprising an insulating base block, a plurality of elongated terminal members mounted on said block and extending away from one side thereof, a rotary member journaled in said block and extending therethrough, said rotary member having an operating portion extending from said block on the side thereof remote from said terminal members and carrying a cam surface on the other side of said block, a pair of bimetal elements rigidly secured together at adjacent ends thereof in substantially parallel spaced relation and pivotally mounted at their said ends on the block on an axis parallel with that of said rotary member, a cam follower in operative relation to the free end of one of said bimetal elements, a fixed contact mounted on one of said terminal members, a leaf spring mounted on another of said terminal members perpendicularly thereto and carrying a moving contact cooperating with said fixed contact, a snap-action element connecting said leaf spring with an intermediate portion of a double-cranked lateral extension of the last-mentioned terminal member, a back stop for said moving contact carried by the outer end of said double-cranked extension, an abutment providing operative engagement between said leaf spring and the other of said bimetal elements, and a heating element for one of said bimetal elements connected between that terminal member carrying one of said contacts and another of said terminal members and operative to heat the last-mentioned bimetal element under control of said contacts and cause alternate opening and closing of said contacts with a ratio of closed time to open time adjustable by said cam.

6. An electric energy regulator of the kind referred to, comprising an insulating base block, a plurality of elongated terminal members mounted on said block and extending away from one side thereof, a rotary member journaled in said block and extending therethrough, said rotary member having an operating portion extending from said block on the side thereof remote from said terminal members and carrying a cam surface on the other side of said block, a pair of bimetal elements rigidly secured together at adjacent ends thereof in substantially parallel spaced relation and pivotally mounted at their said ends on the block on an axis parallel with that of said rotary member, a cam follower in operative relation to the free end of one of said bimetal elements, a fixed contact mounted on one of said terminal members, a co-operating moving contact and snap-action spring assembly mounted on another of said terminal members with the contact moving element of said assembly in operative relation with the free end of the other of said bimetal elements, and a heating element for one of said bimetal elements connected between that terminal member carrying one of said contacts and another of said terminal members and operative to heat the last-mentioned bimetal element under control of said contacts and cause alternate opening and closing of said contacts with a ratio of closed time to open time adjustable by said cam, a second switch having fixed and movable contacts carried by two of said terminal members, respectively, and a cam surface on said rotary member in displacing connection with the movable contact of said second switch.

7. An electric energy regulator of the kind referred to, comprising an insulating base block, a plurality of elongated terminal members mounted on said block and extending away from one side thereof, a rotary member journaled in said block and extending therethrough, said rotary member having an operating portion extending from said block on the side thereof remote from said terminal members and carrying a cam surface on the other side of said block, a pair of bimetal elements rigidly secured together at adjacent ends thereof in substantially parallel spaced relation and pivotally mounted at their said ends on the block on an axis parallel with that of said rotary member, a cam follower in operative relation to the free end of one of said bimetal elements, a fixed contact mounted on one of said bimetal members, a co-operating moving contact and snap-action spring assembly mounted on another of said terminal members with the contact moving element of said assembly in operative relation with the free end of the other of said bimetal elements, and a heating element for one of said bimetal elements connected between that terminal member carrying one of said contacts and another of said terminal members and operative to heat the last-mentioned bimetal element under control of said contacts and cause alternate opening and closing of said contacts with a ratio of closed time to open time adjustable by said cam, a second snap-action switch having fixed and movable contacts carried by two of said terminal members, respectively, a lever pivotally mounted on said cam follower and having an abutment surface engaging a cam surface of said rotary member, and an abutment between said lever and the movable contact of said second switch.

GEOFFREY LAURENCE WOOLNOUGH.

REFERENCES CITED

The following references are of record in the file of this patent:

UNITED STATES PATENTS

| Number | Name | Date |
| --- | --- | --- |
| 1,487,515 | Hall | Mar. 18, 1924 |
| 2,172,189 | Clark | Sept. 5, 1939 |
| 2,425,030 | Clark | Aug. 5, 1947 |

FOREIGN PATENTS

| Number | Country | Date |
| --- | --- | --- |
| 517,538 | Great Britain | Feb. 1, 1940 |